April 21, 1964 T. DEL PINO SUÁREZ 3,129,595
INTERMITTENT GRIP TYPE MECHANICAL MOVEMENT
Filed Dec. 8, 1960 2 Sheets-Sheet 1
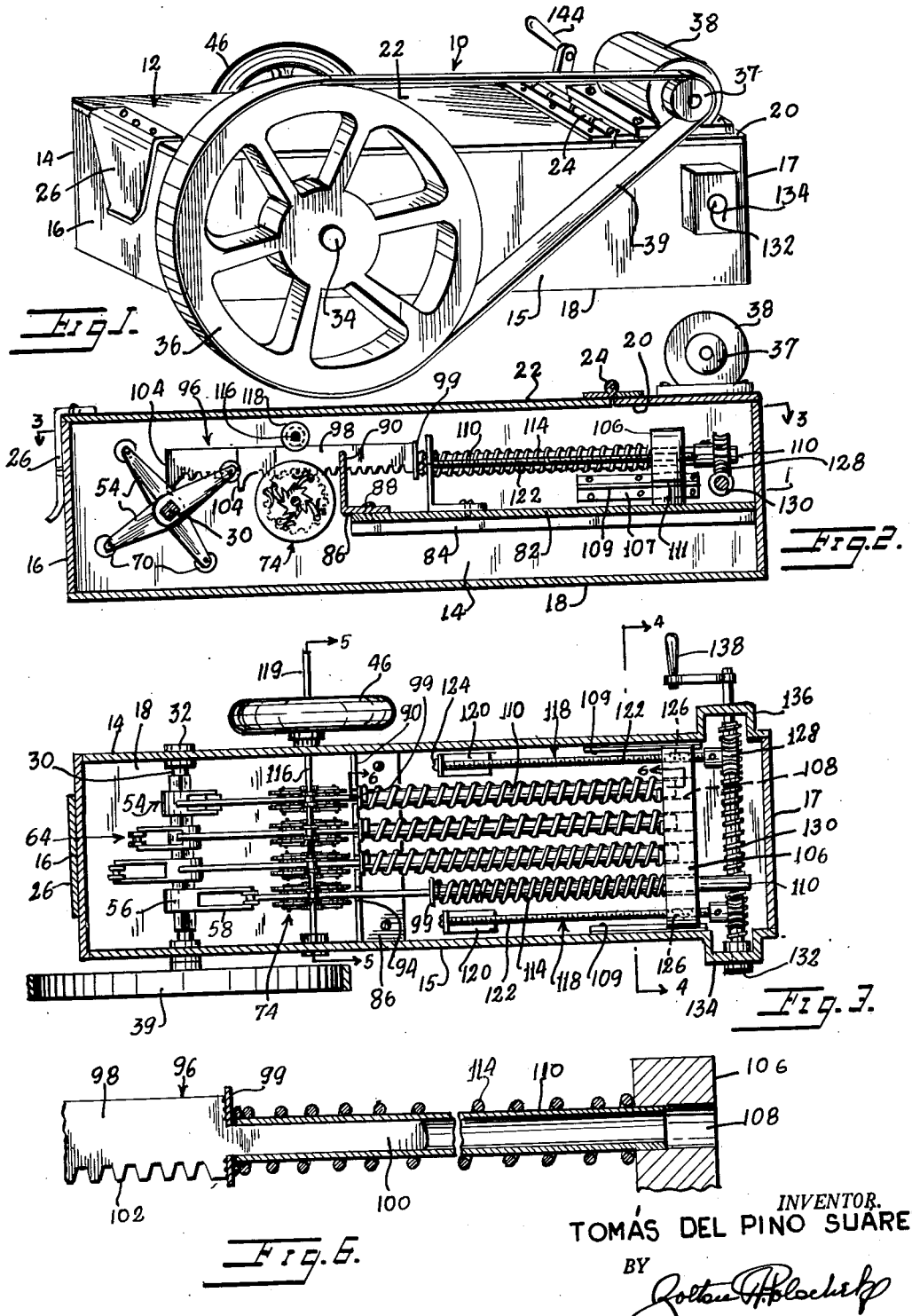
INVENTOR.
TOMÁS DEL PINO SUÁREZ
BY
ATTORNEY April 21, 1964     T. DEL PINO SUÁREZ     3,129,595
INTERMITTENT GRIP TYPE MECHANICAL MOVEMENT
Filed Dec. 8, 1960     2 Sheets-Sheet 2

INVENTOR.
TOMÁS DEL PINO SUÁREZ
BY
ATTORNEY

United States Patent Office 3,129,595
Patented Apr. 21, 1964

3,129,595
INTERMITTENT GRIP TYPE MECHANICAL MOVEMENT
Tomás del Pino Suárez, 204 21st St., Brooklyn, N.Y.
Filed Dec. 8, 1960, Ser. No. 74,716
1 Claim. (Cl. 74—120)

This invention relates generally to power machines and more particularly to a machine having mechanism for converting electrical power to mechanical power adapted to do useful work such as turn a generator or the like.

A principal object of the present invention is to provide simple, efficient and compact mechanism for reliably and continuously turning a shaft for doing useful work.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a machine embodying the invention.

FIG. 2 is a side view with a side wall removed, a rack bar being shown extended.

FIG. 3 is a sectional view taken on the line 3—3 of FIG. 2.

FIG. 6 is an enlarged sectional view taken on the line 6—6 of FIG. 3, parts being broken away.

Figure 4:
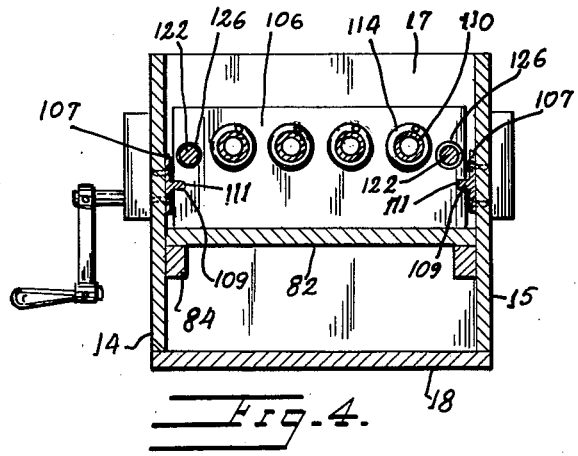
FIG. 4 is an enlarged sectional view taken on the line 4—4 of FIG. 3.
Figure 9:
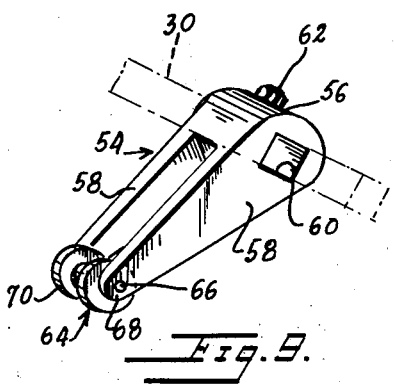
FIG. 9 is an enlarged perspective view of the motion transmitting tappet, parts being broken away.
Figure 5:
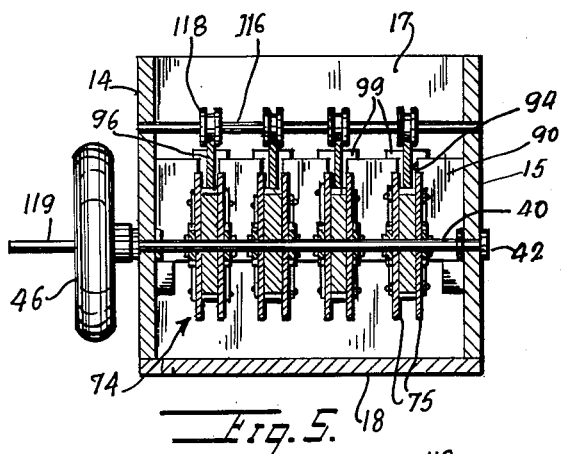
FIG. 5 is an enlarged sectional view taken on the line 5—5 of FIG. 3.
Figure 7:
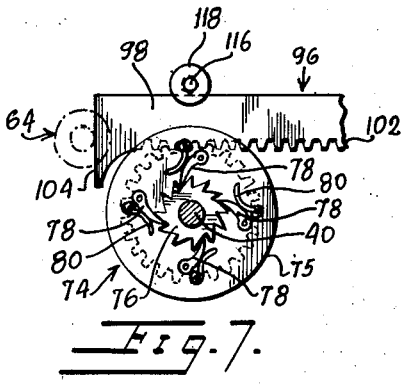
FIG. 7 is an enlarged detail view showing the connection between the rack bar and toothed wheel.
Figure 8:
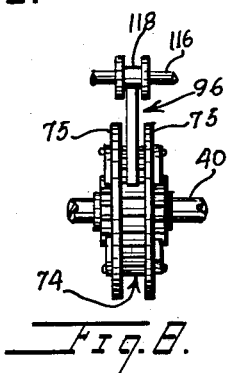
FIG. 8 is an edge view, looking from the left of FIG. 7.

Referring in detail to the drawings, a machine embodying the present invention is shown in FIG. 1 and is designated generally by the reference numeral 10. This machine comprises a rectangular-shaped hollow casing 12 formed of wood or any other suitable material. The casing has side walls 14, 15, end walls 16, 17, a bottom wall 18 and is closed at the top by a fixed wall section 20 at one end and by a movable cover 22 secured at one end to the fixed wall section by a hinge assembly 24. The other end of the cover is formed with a downwardly extending V-shaped handle 26 for raising the cover.

A horizontally disposed drive shaft 30 extends across the inside of the casing with its ends journalled in bearings 32 on the side walls thereof. One end 34 of the shaft extends outwardly of the side wall 14 and is operatively connected to a large drive wheel 36. The drive wheel is driven by an electric motor 38 mounted on the fixed top wall section 20 by means of a belt 39 passing around the motor shaft 37 and wheel 36.

Extending horizontally across the casing and spaced a predetermined distance inwardly of the drive shaft 30 there is a driven shaft 40. Shaft 40 is journalled in bearings 42 on the side walls 14, 15 and one end of the shaft extends through an opening in the side wall 14. The projecting end of the driven shaft 40 has secured thereto a fly wheel 46.

Mechanism will now be described for transmitting the drive from drive shaft 30 to driven shaft 40. At spaced intervals along the shaft 30, a series of tappet devices 54 of metal or other suitable material are fixedly mounted, four of such devices being shown but any desired number may be used. Each tappet device includes a solid cylindrical body 56 formed with spaced radial elongated tapered arms 58. The body is formed with a transverse bore 60 to receive the drive shaft 30 and a setscrew 62 secures the body on the shaft. A roller assembly 64 is supported between the outer spaced ends of the arms 58. This roller device comprises a stub shaft 66 journalled in bearing openings 68 in the ends of the arms and a flanged roller 70 rotatably mounted on the shaft inside the ends of the arms. The radial tappet devices 54 are offset from and angularly disposed relative to each other around the shaft 30.

A series of idler toothed wheels 74, equal in number to the tappet devices, are each loosely mounted on the driven shaft 40. Each wheel is formed with spaced peripheral flanges 75. A ratchet wheel 76 is fixed on the driven shaft 40 alongside each toothed wheel 74 and carried on each toothed wheel are a plurality of pivoted pawls 78 normally pressed against the teeth on the ratchet wheel 76 by a spring 80 on the toothed wheel.

A shelf or platform 82 is provided in the casing spaced above the bottom wall 18 and supported on rails 84 secured to the side walls 14 and 15. The inner end of the shelf is free and supports a plate 86 thereacross secured thereon by screws 88. The plate projects beyond the free end of the shelf and has an upstanding flange 90 along its projecting long edge. The flange is formed with spaced cut-away portions 94 intersecting the top edge of the flange.

A series of rack bars 96 are horizontally and slidably supported in spaced relation over the toothed wheels 74. Each rack bar comprises an elongated flat body 98 vertically arranged and an elongated flat stem 100 narrower than the body. The body of the bar has teeth 102 along one long edge thereof in mesh with the toothed wheel 74 therebelow. The body is also formed with a head 104 at one end thereof disposed in the path of arcuate movement of the roller 64 on the tappet device 54 in line therewith. A collar 99 is secured by welding or the like to the body of the bar at its juncture with the stem 100. The stem 100 of each bar at its free end extends loosely through the adjacent cut-away portion 94 formed in the flange 90 of plate 86. A block 106 is mounted on the shelf 82 at its fixed end and slidable therealong. A plate 107 is fastened to the inside surface of each side wall 14 and 15 and is formed with an inwardly extending flange 109 centrally thereof adapted to slide in a groove 111 formed in the adjacent outer end surface of the block. The flanges serve as trackways for guiding the movement of the block. The block is formed with spaced transverse openings 108. Each bar 96 has one end of a tube 110 sleeved around its stem 100, the end being welded to the collar 99. The other end of the tube is slidably fitted in the opposite opening 108 in block 106. The tube is slidably supported by the block 106. Around each tube 110 there is sleeved a compression spring 114, one end of the spring being seated against the inner face of the block 106 and its other end impinging against the collar 99 of the bar. The tube prevents the spring from buckling and normally urges the rack bar to the left as viewed in FIGS. 2 and 3.

A horizontally arranged shaft 116 supported in side walls 14 and 15 and disposed above and in line with the driven shaft 40 supports a series of flanged rollers 118, which rollers engage the top edges of the bodies of the rack bars 96 between the flanges thereof for guiding the movement of the rack bars and for preventing displacement thereof.

In operation, power is supplied to the drive shaft 30 by the motor 38, roller 37, belt 39 and wheel 36 and the shaft in turning carries the tappet devices 54 around with it, and as the roller assembly 64 of each tappet device swings around it strikes the broad edge of the head 104 of its respective rack bar 96 thereby kicking said rack bar to the right as viewed in FIG. 2 across its toothed wheel 74 against the action of its spring 114 and turning the toothed wheel 74 around. Upon continued movement of the tappet device, it moves downwardly away from the broad edge of the rack bar thereby releasing pressure thereupon, whereupon the spring 114 comes into action and returns the rack bar to the left as viewed in FIG. 2 to normal position in position to be struck by the roller of the tappet device when it swings around again. The rack bar 96 in returning to normal position, causes the pawls 78 carried by the toothed wheel 74 to move the adjacent ratchet wheel 76 one tooth around in an anticlockwise direction as viewed in FIG. 2, one tooth constituting one-quarter of a turn of the shaft.

Simultaneously with the removal of the roller of the tappet device from the broad edge of the rack bar, another tappet device 54 engages its respective rack bar 96 thereby turning the driven shaft 40 a distance of one tooth in the same direction. The shaft 40 is thus continuously driven in one direction by the tappet devices on the drive shaft 30 and this turning of shaft 40 is equalized by the flywheel 46 on the protruding end thereof. The shaft 40 extends beyond the flywheel as indicated at 119. The turning of the shaft extension 119 may be put to any useful work such as turning a generator or the like. The machine may also be used for display and educational purposes.

The pressure or tension of the retractile springs 114 may be adjusted by moving the block 106 toward or away from the driven shaft 40. For this purpose, a pair of elongated screw assemblies 118 supported by brackets 120 is mounted on the shelf and disposed outwardly of the tubes 110. Each screw assembly includes an elongated feed screw 122 having one end extending through an opening in the bracket 120 and secured therein by a nut 124. The other end of the screw extends through the threaded opening 126 in the block 106 adjacent the end thereof. The feed screw is driven by a worm wheel 128 fastened to the protruding end of the screw. The worm wheel 128 is turned by means of a worm shaft 130 in engagement therewith.

Worm shaft 130 is journalled in a bearing 132 mounted in the outer wall of an opening in the outer wall of a box-like extension 134 formed on wall 15, the other end of the shft being journalled in an opening in the outer wall of a similar box-like extension 136 formed on wall 14 opposite the extension 134. The shaft extends beyond the extension 136 and a handle 138 fixed thereon is adapted to turn the shaft 130. When the worm shaft 130 is turned, the screws 122 turn, moving the block 106 inwardly against the action of the springs 114 so that the initial pressure of the springs may be readily adjusted.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

In a machine for converting electrical power to mechanical power, the combination of a hollow casing having side walls, a drive shaft journalled in the side walls with one end extending outwardly from the casing, a wheel on the extension of the shaft, a motor operatively connected to the wheel for rotating the drive shaft, a driven shaft similarly mounted inwardly of the drive shaft, an extension on said driven shaft and driven thereby for useful work, and mechanism transmitting the drive from the drive shaft to the driven shaft including tappet devices fixed on the drive shaft offset angularly from each other around the shaft, rollers carried on the ends of said tappet devices, rack bars slidably mounted in the casing, said rack bars having heads on one end thereof in the path of movement of the tappet devices and moved thereby, idler toothed wheels loosely mounted on said driven shaft in mesh with said rack bars and movable thereby, ratchet wheels fixed on said driven shaft alongside the wheels, spring-pressed pawls fixed on the wheels and interlocked with the teeth on the ratchet wheels for turning the ratchet wheels, said rack bars on each including an elongated stem, a collar at the juncture of the body of the rack bar and its stem, a block slidably mounted in the casing at one end thereof, said block having threaded openings therethrough adjacent one end thereof, a retractile spring coiled around each stem, one end of the spring seated against the collar and its other end impinging against the block, said retractile springs adapted to retract said rack bars upon release of pressure of the tappet devices thereupon, a pair of feed screws supported in the casing outwardly of the rack bars, one end of said screws extending through the threaded openings in the block and coacting therewith to move said block, and means actuated from outside of the casing for turning said feed screws whereby the tension of the retractile springs may be adjusted, including worm gears fixed on one end of the feed screws and a worm shaft meshing with the worm gears, said worm shaft having a portion extending outwardly of the casing and a handle on the outwardly extending portion for turning the worm shaft.

References Cited in the file of this patent

UNITED STATES PATENTS

| 1,990,735 | Jones | Feb. 12, 1935 |
| 2,735,306 | Reed | Feb. 21, 1956 |
| 2,940,327 | Gartner | June 14, 1960 |
| 2,970,486 | Bruestle | Feb. 7, 1961 |

FOREIGN PATENTS

| 14,650 | Switzerland | July 2, 1897 |
| 236,952 | Germany | July 14, 1911 |
| 458,987 | France | Aug. 21, 1913 |
| 650,826 | Germany | Oct. 2, 1937 |
| 705,013 | Germany | Apr. 15, 1941 |
| 1,000,619 | France | Oct. 17, 1951 |
| 879,499 | Germany | June 15, 1953 |
| 491,824 | Italy | Mar. 11, 1954 |
| 1,085,731 | France | July 28, 1954 |